United States Patent
Kay

[11] Patent Number: 6,166,760
[45] Date of Patent: Dec. 26, 2000

[54] INGRESS NOISE MEASURING DEVICE IN DATA COMMUNICATION NETWORK USING CATV NETWORK

[75] Inventor: Shin-Woong Kay, Kyonggi-do, Rep. of Korea

[73] Assignee: Samsung Electronics Co., Ltd., Kyungki-Do, Rep. of Korea

[21] Appl. No.: 09/222,944

[22] Filed: Dec. 30, 1998

[30] Foreign Application Priority Data

Dec. 31, 1997 [KR] Rep. of Korea ............. 97-80507

[51] Int. Cl.[7] .................................................. H04N 7/10
[52] U.S. Cl. ................................................. 348/12; 348/192
[58] Field of Search .................................. 455/5.1; 348/12, 348/13, 192, 193, 180

[56] References Cited

U.S. PATENT DOCUMENTS

| | | |
|---|---|---|
| 3,750,022 | 7/1973 | Curry et al. ........................... 325/53 |
| 3,875,328 | 4/1975 | Gibson et al. ........................ 178/6 |
| 4,581,641 | 4/1986 | Turner .................................. 358/167 |
| 5,073,822 | 12/1991 | Gumm et al. ........................ 358/139 |
| 5,872,456 | 2/1999 | Roderick et al. .................... 324/637 |
| 5,915,205 | 6/1999 | Chen ..................................... 455/5.1 |

*Primary Examiner*—Nathan Flynn
*Assistant Examiner*—Ngoc Vu
*Attorney, Agent, or Firm*—Sughrue, Mion, Zinn, Macpeak & Seas, PLLC

[57] ABSTRACT

There is provided an ingress noise measuring device for each subscriber's terminal in a data communication network using a cable television (CATV) network. The ingress noise measuring device has a transformer connected between a cable MODEM and the CATV network, a switch connected between the transformer and the cable MODEM, and an RF radio-transmission unit for radio-transmitting an RF signal by switching. A display is connected to a contact point between the transformer and the subscriber's terminal, for visually displaying the strength of the RF signal received from the subscriber's terminal.

17 Claims, 3 Drawing Sheets

INGRESS NOISE MEASURING DEVICE IN DATA COMMUNICATION NETWORK USING CATV NETWORK

BACKGROUND OF THE INVENTION

1. Field of the Invention

The present invention relates to a data communication network using a cable television (CATV) network, and in particular, to a data communication network using coaxial lines between a head end and subscriber terminals.

2. Description of the Related Art

In general, a data communication network using a CATV network suffers much upstream ingress noise, which affects communications between a head end and terminals such as a cable MODEM (Modulator-Demodulator).

FIG. 1 is a block diagram of a general data communication network using a CATV network. In the data communication network, cable MODEMs 106 provided to subscribers' houses are connected to a head end 100 via a hybrid fiber coax (HFC) network. Here, a downstream path refers to a data transfer path from the head end 100 to the respective cable MODEMs 106, whereas an upstream path refers to a reverse data transfer path. A downstream band is in the range of 54 MHz to 750 MHz, and an upstream band is in the range of 5 MHz to 42 MHz. Between the head end 100 and the cable MODEMs 106 is connected a bidirectional amplifier 102. A bidirectional coupler 104 is connected between the bidirectional amplifier 102 and each cable MODEM 106. A coaxial line or an optical fiber is used to connect the head end 100 with the bidirectional amplifier 102, and a coaxial line is used to connect the bidirectional amplifier 102 with the bidirectional couplers 104. The bidirectional couplers 104 are also connected to the cable MODEMs 106 by a coaxial line. That is, the head end 100 is connected to the bidirectional couplers 104 via the HFC network. When connecting a coaxial line with each cable MODEM 106, an F-type connector is used.

FIG. 2 is a block diagram illustrating connection between such a cable MODEM and a coaxial line. A cable MODEM 200 corresponds to each of the cable MODEMs 106 shown in FIG. 1. Generally, an F-type male connector 202 is on the side of the cable MODEM 106, while an F-type female connector 204 is on the side of the coaxial line. In most cases, connection of the cable MODEM 200 to a coaxial line 206 with the F-type connectors is just made mechanically, but not verified afterwards. That is, after the cable MODEM 200 is connected to the coaxial line 206 with the F-type connectors, it is not checked whether they are tightly connected by repeatedly turning the F-type female connector 204. Therefore, user manipulation may loosen the connection between the cable MODEM 200 and the coaxial line 206.

Down stream data experiences no ingress noise in a general CATV network. On the contrary, noise in the band of 5 MHz to 42 MHz, generated from various electrical appliances including a hair dryer, a washing machine, a vacuum cleaner, and the like, may be introduced into upstream data through the loosely connected cable MODEM 200 and coaxial line 206 because each cable MODEM 106 transfers data to the head end 100 with a different frequency spectrum. This ingress noise is loaded on a radio frequency (RF) signal output from the cable MODEM 106 and amplified in the bidirectional amplifier 102, and reaches the head end 100. Ingress noise can be simultaneously introduced from different cable MODEMs 106 and amplified, resulting in intermodulation of different noise signals. Hence, a signal-to-noise (S/N) ratio remarkably drops in the head end 100, thereby adversely influencing communications between the head end 100 and the cable MODEMs 106.

To block such ingress noise, it should be determined from which cable MODEM the ingress noise was produced. However, it is impossible in the prior art to track back the origin of an ingress noise-including RF signal, let alone block it. Therefore, the RF signal including ingress noise is transferred to the head end 100 and impedes data communications through the HFC network.

SUMMARY OF THE INVENTION

Therefore, an object of the present invention is to provide an ingress noise measuring device for measuring ingress noise introduced from each subscriber terminal in a data communication network using a CATV network.

Another object of the present invention is to provide a device for visually displaying the presence or absence of ingress noise introduced from each subscriber terminal in a data communication network using a CATV network.

To achieve the above objects, there is provided an ingress noise measuring device in a data communication network using a CATV network. The device includes a transformer connected between a cable MODEM and the CATV network, a switch connected between the transformer and the cable MODEM, and an RF radio-transmission unit for radio-transmitting an RF signal by switching.

According to another aspect of the present invention, the device includes a coupling transformer connected between a subscriber's terminal and the CATV network, and a display connected to a contact point between the transformer and the subscriber's terminal, for displaying the strength of an RF signal received from the subscriber's terminal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT

A detailed description of a preferred embodiment of the present invention will hereinbelow be given with reference to the attached drawings. It is to be noted that many details such as circuits or components are disclosed in the description and drawings to provide a comprehensive description of the subject matter of the present invention, but they are merely exemplary. Detailed descriptions of known functions and structures used in the present invention are omitted to avoid obscuring the subject matter of the present invention.

Figure 1:
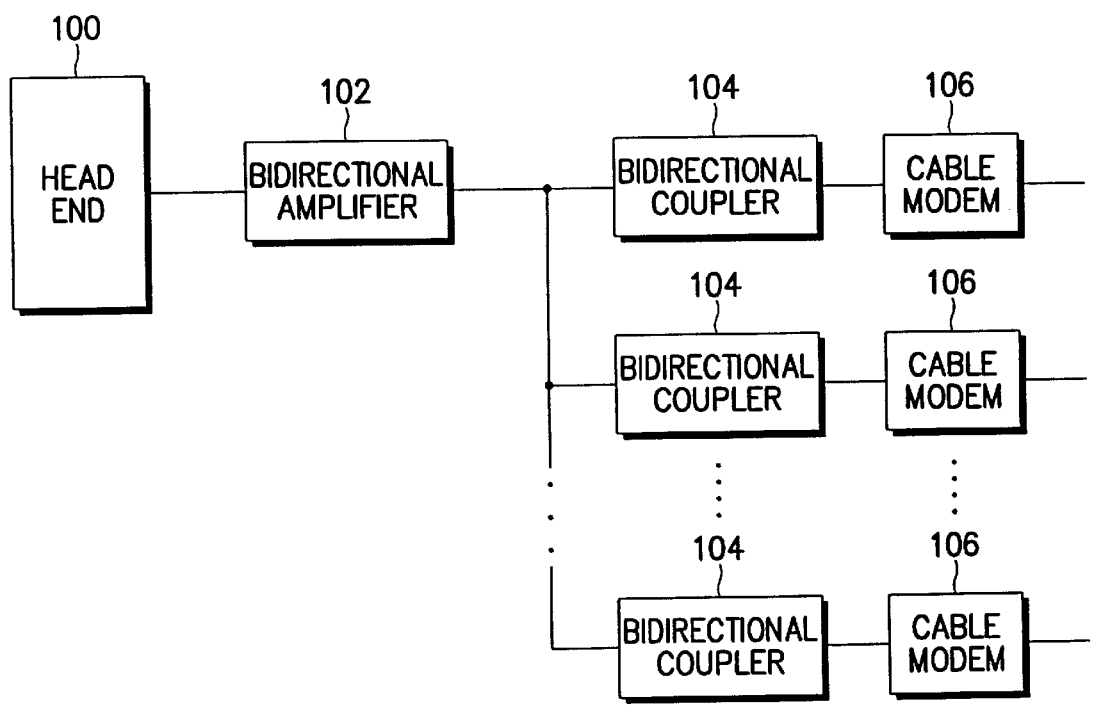
FIG. 1 is a block diagram of a general data communication network using a CATV network.
Figure 2:
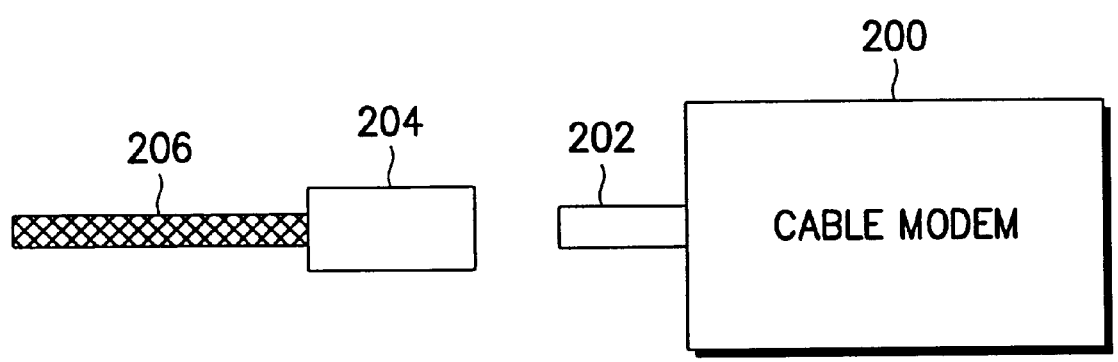
FIG. 2 is a block diagram illustrating a connection between a cable MODEM and a coaxial line.

In the data communication network using a CATV network as shown in FIG. 1, a signal output from each cable MODEM 106 is transferred to the head end 100 via its corresponding bidirectional coupler 104. That is, the bidirectional couplers 104 are the first gateway through which coaxial lines of the HFC network enter the subscribers' houses. In a preferred embodiment of the invention, an RF radio transmission unit for wirelessly transmitting an RF signal received from a cable MODEM is provided in each bidirectional coupler 104 to thereby measure the strength of a radio-transmitted ingress noise signal. Here, a general spectrum analyzer may be used as a measuring instrument. A display, for example, a light emitting diode (LED) is also provided to the bidirectional coupler 104 to visually display the strength of the RF signal. In the case of the LED, its brightness is varied or when using an LED array, the number of illuminated LEDs is changed, in accordance with the strength of the RF signal.

Figure 3:
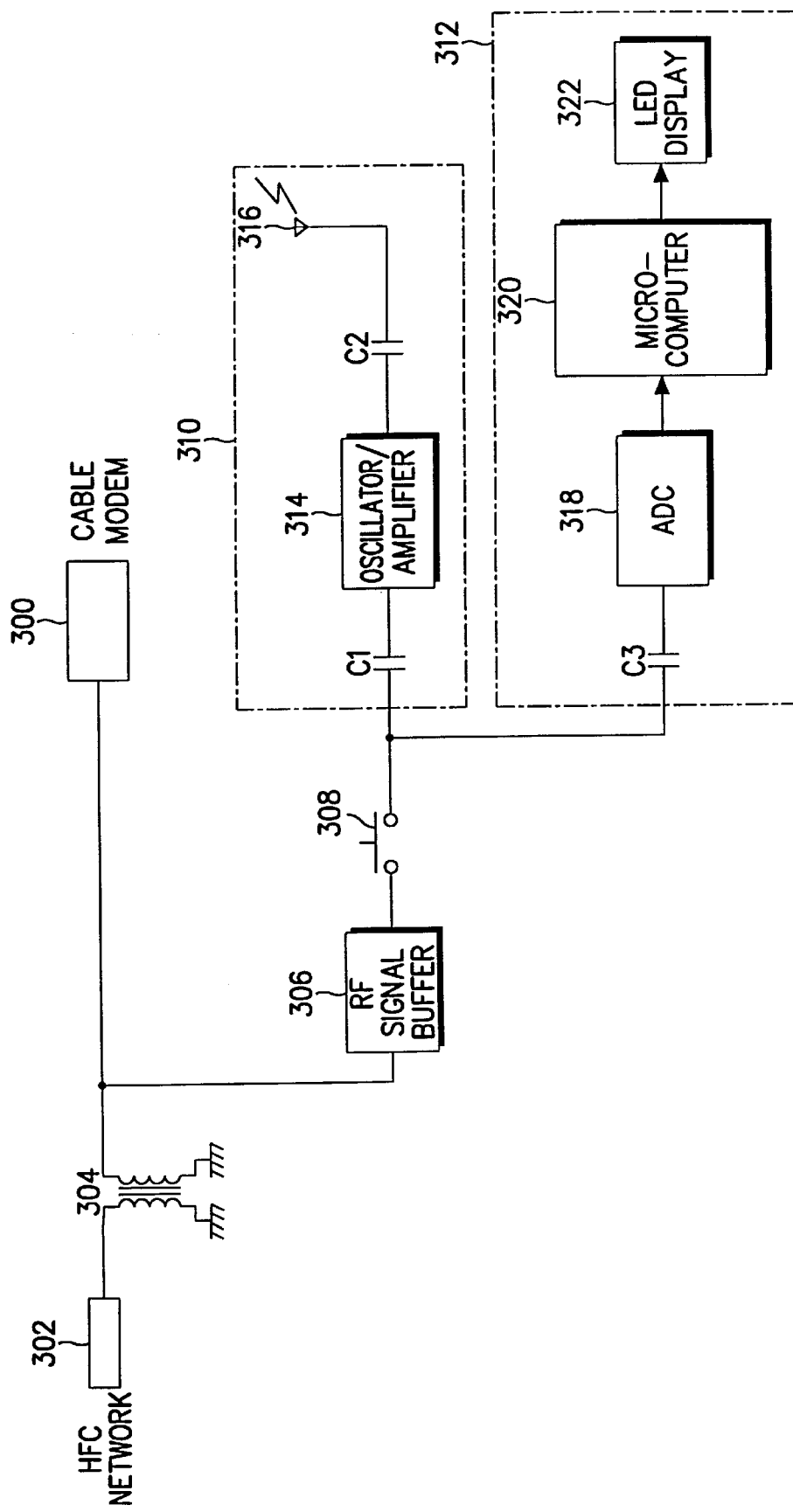
FIG. 3 is a block diagram of a bidirectional coupler having an ingress noise measuring device according to an embodiment of the present invention.

FIG. 3 is a block diagram of a bidirectional coupler having an ingress noise measuring device according to an embodiment of the present invention. A coupling transformer 304 in FIG. 3 corresponds to each bidirectional coupler 104 and is connected between its corresponding subscriber's terminal cable MODEM and an HFC network. By way of example, an F-type female connector 300 and an F-type male connector 302 are used to connect the coupling transformer 304 with the cable MODEM and a coaxial line of the HFC network, respectively.

An RF signal buffer 306 is connected to a contact point between the coupling transformer 304 and a cable MODEM. More particularly, the F-type female connector 300 junction provides an input to the RF signal buffer 306, and a switch 308 is connected to an output terminal of the RF signal buffer 306. To an output terminal of the switch 308 are commonly connected an RF radio-transmission unit 310 and a display 312.

The RF radio-transmission unit 310 includes coupling capacitors C1 and C2, an oscillator/amplifier 314, and an antenna 316. The coupling capacitor C1 is connected to the output terminal of the switch 308, and the oscillator/amplifier 314 oscillates a radio-transmission signal at the level of an RF signal received from the coupling capacitor C1 and amplifies the oscillated signal. The capacitor C2 is connected to an output terminal of the oscillator/amplifier 314, and the antenna 316 is connected to the output terminal of the oscillator/amplifier 314 via the coupling capacitor C2, for wirelessly transmitting an output signal of the oscillator/amplifier 314. Therefore, when the switch 308 turns on, the RF radio-transmission unit 310 wirelessly transmits an RF signal received from a subscriber's terminal, cable MODEM.

The display 312 includes a coupling capacitor C3, an analog/digital converter (ADC) 318, a microcomputer 320, and an LED display 322. The coupling capacitor C3 is connected to the output terminal of the switch 308. The ADC 318 converts an RF signal received via the coupling capacitor C3 to a digital signal and outputs data at the level of the RF signal to the microcomputer 320. The microcomputer 320 drives an LED of the LED display 322 in accordance with the output data of the ADC 318. Thus, when the switch 308 turns on, the display 312 visually displays the strength of the RF signal output from the subscriber terminal, cable MODEM.

In the above structure, an RF signal headed for the head end 100 from a corresponding cable MODEM connected to the F-type female connector 300 among the cable MODEMs 106 of FIG. 1 is fed to the coupling transformer 304 via the F-type female connector 300. Then, this signal passes through the F-type male connector 302 and reaches the head end 100 over the HFC network. Here, when the switch 308 turns off, the RF signal is applied neither to the RF radio-transmission unit 310 and nor to the display 312. Under this circumstance, if ingress noise is introduced due to a loose connection between the F-type female connector 300 and the cable MODEM, the ingress noise is loaded on the RF signal and transfers to the head end 100. It is also not possible to determine which cable MODEM is the source of the ingress noise.

To measure the introduced ingress noise, a user turns on the switch 308. Then, an ingress noise-including RF signal is applied to the RF radio-transmission unit 310 and the display 312 via the RF signal buffer 306 and the switch 308. Here, the RF signal buffer 306 serves to prevent the RF signal headed for the head end 100 from being attenuated due to the loading effect generated by turning on the switch 308. Therefore, if the attenuation of the RF signal is negligible in measuring the ingress noise, there is no need for the RF signal buffer 306.

In the RF radio-transmission unit 310, the ingress noise-including RF signal is applied to the oscillator/amplifier 314 via the coupling capacitor C1 to be converted to a radio-transmission signal and amplified. The oscillator/amplifier 314 is used to convert the input RF signal to a radio-transmission signal. Therefore, a signal should be oscillated in the oscillator/amplifier 314 in such a way that it can be measured in a measuring device for wirelessly measuring ingress noise. An output signal of the oscillator/amplifier 314 is radio-transmitted through the antenna 316. The level of the radio-transmitted ingress noise-including signal increases with more ingress noise, and thus can be measured by a measuring instrument such as a spectrum analyzer.

The ingress noise-including RF signal applied to the display 312 is converted to its corresponding data in the ADC 318 and output to the microcomputer 320. Then, the microcomputer 320 drives the LED of the LED display 322 according to the output data of the ADC. Thus, the strength of the ingress noise-including RF signal can be visually displayed by the LED display 322.

Constitution of each bidirectional coupler 104 connected to its corresponding cable MODEM in a subscriber's house, as shown in FIG. 1, enables ingress noise to be measured by a measuring instrument and visually displayed.

Accordingly, in a case where ingress noise is introduced from a subscriber's terminal and reaches a head end, and thus adversely influences data communications in a data communication network using a CATV network, the noise-producing subscriber terminal can be tracked down, and the strength of the ingress noise can be measured and visually checked. As a result, the ingress noise can be prevented. That is, from the radio transmission from RF transmission unit 310, the subscriber terminal responsible for an ingress noise-including RF signal is detected, and its F-type female connector is checked and tightly connected, so that the introduction of the ingress noise is prevented.

While the present invention has been described with reference to the specific embodiment, many variations can be made by anyone skilled in the art within the scope and spirit of the present invention. In particular, though the switch 308 is used for a user to selectively operate the RF radio-transmission unit 310 and the display 312 in the embodiment of the present invention, the RF radio-transmission unit 310 and the display 312 can always be operative without the switch 308. The F-type connector can be replaced with a different type. Further, radio transmission and visual display of an RF signal can be selectively applied when necessary. The RF signal buffer 306 may be omitted as far as its absence has no serious influence on operation of the device, and the LED can be replaced with another light emitting device such as an electroluminescence (EL) or a phosphor indicator tube, or an LCD (Liquid Crystal Display). Thus, the appropriate scope of the present invention should be set forth by the following claims.

What is claimed is:

1. An ingress noise measuring device in a data communication network using a CATV network including a coaxial line connected to a head end, and wherein the coaxial line is connected to a subscriber's terminal, the measuring device comprising:

a coupling transformer connected between the subscriber's terminal and the CATV network; and an RF radio-transmission unit connected to a contact point between the coupling transformer and the subscriber's terminal, for radio-transmitting an RF signal output from the subscriber's terminal.

2. The device of claim 1, further comprising a switch connected between the RF radio-transmission unit and the contact point between the coupling transformer and the subscriber's terminal.

3. The device of claim 2, further comprising an RF signal buffer connected between the switch and the contact point between the coupling transformer and the subscriber's terminal, for buffering the RF signal.

4. The device of claim 3, wherein the RF radio-transmission unit comprises:

a first coupling capacitor connected to an output terminal of the switch;

an oscillator/amplifier for oscillating a signal to be radio-transmitted at a level of an RF signal received from the first coupling capacitor and amplifying the oscillated signal;

a second coupling capacitor connected to an output terminal of the oscillator/amplifier; and an antenna connected to the output terminal of the oscillator/amplifier via the second coupling capacitor, for radio-transmitting the output signal of the oscillator/amplifier.

5. The device of claim 1, further comprising an RF signal buffer connected between the RF radio transmission unit and the contact point between the coupling transformer and the subscriber's terminal, for buffering the RF signal.

6. The device of claim 5, wherein the RF radio-transmission unit comprises:

a first coupling capacitor connected to an output terminal of the switch;

an oscillator/amplifier for oscillating a signal to be radio-transmitted at a level of an RF signal received from the first coupling capacitor and amplifying the oscillated signal;

a second coupling capacitor connected to an output terminal of the oscillator/amplifier; and an antenna connected to the output terminal of the oscillator/amplifier via the second coupling capacitor, for radio-transmitting the output signal of the oscillator/amplifier.

7. An ingress noise measuring device in a data communication network using a CATV network including a coaxial line connected to a head end, and wherein the coaxial line is connected to a subscriber's terminal, the measuring device comprising:

a coupling transformer connected between the subscriber's terminal and the CATV network; and a display connected to a contact point between the coupling transformer and the subscriber's terminal, for visually displaying the strength of an RF signal output from the subscriber's terminal.

8. The device of claim 7, further comprising a switch connected between the display and the contact point between the coupling transformer and the subscriber's terminal.

9. The device of claim 8, further comprising an RF signal buffer connected between the switch and the contact point between the coupling transformer and the subscriber's terminal, for buffering the RF signal.

10. The device of claim 9, wherein the display comprises:

a coupling capacitor connected to an output terminal of the switch;

an analog/digital converter for converting an RF signal received through the coupling capacitor to a digital signal and outputting the digital data at a level of the RF signal;

an LED display having an LED; and a microcomputer for driving the LED of the LED display in accordance with the output data of the analog/digital converter.

11. The device of claim 7, further comprising an RF signal buffer connected between the display and the contact point between the coupling transformer and the subscriber's terminal, for buffering the RF signal.

12. The device of claim 11, wherein the display comprises:

a coupling capacitor connected to an output terminal of the switch;

an analog/digital converter for converting an RF signal received through the coupling capacitor to a digital signal and outputting the digital data at a level of the RF signal;

an LED display having an LED; and a microcomputer for driving the LED of the LED display in accordance with the output data of the analog/digital converter.

13. An ingress noise measuring device in a data communication network using a CATV network including a coaxial line connected to a head end, and wherein the coaxial line is connected to a subscriber's terminal, the measuring device comprising:

a coupling transformer connected between the subscriber's terminal and the CATV network;

an RF radio-transmission unit connected to a contact point between the coupling transformer and the subscriber's terminal, for radio-transmitting an RF signal output from the subscriber's terminal; and a display connected to the contact point between the coupling transformer and the subscriber's terminal, for visually displaying the strength of an RF signal output from the subscriber's terminal.

14. The device of claim 13, further comprising a switch connected between a) the RF radio-transmission unit and the display and b) the contact point between the coupling transformer and the subscriber's terminal.

15. The device of claim 14, further comprising an RF signal buffer connected between the switch and the contact point between the coupling transformer and the subscriber's terminal, for buffering the RF signal.

16. The device of claim 15, wherein the RF radio-transmission unit comprises:

a first coupling capacitor connected to an output terminal of the switch;

an oscillator/amplifier for oscillating a signal to be radio-transmitted at a level of an RF signal received from the first coupling capacitor and amplifying the oscillated signal;

a second coupling capacitor connected to an output terminal of the oscillator/amplifier; and an antenna connected to the output terminal of the oscillator/amplifier via the second coupling capacitor, for radio-transmitting the output signal of the oscillator/amplifier.

17. The device of claim 16, wherein the display comprises:

a third coupling capacitor connected to an output terminal of the switch;

an analog/digital converter for converting an RF signal received through the third coupling capacitor to a digital signal and outputting the digital data at a level of the RF signal;

an LED display having an LED; and a microcomputer for driving the LED of the LED display in accordance with the output data of the analog/digital converter.

* * * * *